United States Patent
Chen et al.

(10) Patent No.: US 10,157,105 B2
(45) Date of Patent: Dec. 18, 2018

(54) METHOD FOR DATA PROTECTION FOR CLOUD-BASED SERVICE SYSTEM

(71) Applicant: ProphetStor Data Services, Inc., Taichung (TW)

(72) Inventors: Wen Shyen Chen, Taichung (TW); Chun Fang Huang, Taichung (TW); Ming Jen Huang, Taichung (TW)

(73) Assignee: ProphetStor Data Services, Inc., Taichung (TW)

(*) Notice: Subject to any disclaimer, the term of this patent is extended or adjusted under 35 U.S.C. 154(b) by 203 days.

(21) Appl. No.: 15/221,809

(22) Filed: Jul. 28, 2016

(65) Prior Publication Data
US 2018/0032405 A1 Feb. 1, 2018

(51) Int. Cl.
G06F 11/00 (2006.01)
G06F 11/14 (2006.01)
G06F 11/07 (2006.01)

(52) U.S. Cl.
CPC ...... *G06F 11/1451* (2013.01); *G06F 11/0709* (2013.01); *G06F 11/079* (2013.01); *G06F 11/0754* (2013.01); *G06F 11/0787* (2013.01); *G06F 11/1469* (2013.01)

(58) Field of Classification Search
CPC ............. G06F 11/1451; G06F 11/0709; G06F 11/0754; G06F 11/0787; G06F 11/079; G06F 11/1469
See application file for complete search history.

(56) References Cited

U.S. PATENT DOCUMENTS

2003/0204788 A1* 10/2003 Smith ............... G06F 11/004 714/47.3
2015/0127995 A1* 5/2015 Kripalani ......... G06F 11/3409 714/47.1
2015/0205657 A1* 7/2015 Clark ................ G06F 11/008 714/47.3

FOREIGN PATENT DOCUMENTS

CN 104767806 A 7/2015
TW I510916 B 12/2015
WO WO-9923562 A1 * 5/1999 .......... G06F 11/1461

* cited by examiner

*Primary Examiner* — Jason B Bryan
(74) *Attorney, Agent, or Firm* — Che-Yang Chen; Law Office of Scott Warmuth (57) ABSTRACT

A method for data protection in a cloud-based service system is disclosed. The method includes the steps of: A. collecting historical operating data of storage devices in the cloud-based service system; B. building up a life expectancy model and a next-7-days failure probability model by the collected operating data; C. inputting operating data in the past 24-hours into the life expectancy model and the next-7-days failure probability model for every storage device to obtain ranges of expected lifespans in respective groups and corresponding failure probabilities; and D. backing up data in the storage devices according to the results of step C.

17 Claims, 10 Drawing Sheets

| Meta Info | | | Input Operating Data | | | | | | Output | |
|---|---|---|---|---|---|---|---|---|---|---|
| Date | Time | Disk | SMART #1 | SMART #5 | SMART #9 | SMART #194 | Read IOPS | Write IOPS | Disk Type | Bin | Probability |
| 2016/5/12 | 13:45 | first storage device | 305490050 | 0 | 4625 | 0 | 3561 | 215 | SSD | 18 | 35% |
| 2016/5/12 | 13:45 | second storage device | 105326000 | 0 | 3127 | 0 | 1201 | 402 | SSD | 21 | 21% |
| 2016/5/12 | 13:45 | third storage device | 5219821 | 0 | 0 | 10 | 921 | 25 | HDD | 2 | 95% |

|  | Unlikely | Neutral | Likely |
|---|---|---|---|
| *Very long* | Very long | Long | Neutral |
| *Long* | Long | Neutral | Short |
| *Neutral* | Neutral | Neutral | Short |
| *Short* | Short | Short | Very short |
| *Very short* | Short | Very short | Very short |

METHOD FOR DATA PROTECTION FOR CLOUD-BASED SERVICE SYSTEM

FIELD OF THE INVENTION

The present invention relates to a method for data protection. More particularly, the present invention relates to a method for data protection in a cloud-based service system.

BACKGROUND OF THE INVENTION

A workload, e.g. MongoDB, operates in a cloud-based service system which has a cluster of nodes. The workload may run over a single node or multiple nodes in the cloud-based service system. Each of the nodes assigns at least one disk to store data for accessing. For working on a single node, when the assigned disk failed, the workload cannot be executed until backup data are restored. For working on multiple nodes, when one of the assigned disks failed, or even one node is out of order, performance of the cloud-based service system might be degraded since data need to be rebalanced to a new node. Performance of the workload is affected, too. It is obvious that healthy condition of disks in the cloud-based service system and well-planned archive for data restore are the key factors for data protection for workloads.

In fact, there are many techniques providing associated solutions to the requirement above. Most of these solutions are about prediction of lifespan of storage devices. For example, a traditional method for monitoring lifespan of storage devices may include the steps of: setting up a database which records a number of training data, wherein each of the training data includes operating behavior information and a corresponding operating life value; fetching operating behavior information from corresponding storage devices; building up a storage device lifespan prediction model according to the operating behavior information and corresponding operating life value of training data; and inputting the operating behavior information of the storage devices into the storage device lifespan prediction model to generate a predicted life value for individual storage device. The storage device lifespan prediction model can be rebuilt using predicted life value as well. When a first storage device in the storage devices is damaged, record a real lifespan of the first storage device and use it to rebuild the storage device lifespan prediction model.

Although there may be a way to predict lifespan for storage devices so that data protection can be carried out with the predicted results, it still encounters several challenges when applying. First, failure chance of one storage device (HDD or SSD) increases dramatically when the storage device is approaching the end of its lifecycle. However, the aforementioned method relies on training data of operating life value. A sudden failure of the storage device before the designed lifecycle is hard to avoid. Second, failure of the storage device is a result of workloads applied to. Namely, a higher usage the workload demands, a shorter lifespan a storage device has. Influence of workloads is not taken into consideration in previous methods. In addition, data protection should include a proper plan for back-ups of the data stored in the storage devices. If data back-ups are processed often, it may reduce the performance of related workloads. If not, systematic collapse of the workloads may happen. This problem should be settled if predicted lifespan of the storage devices is available.

Therefore, a method for data protection in a cloud-based service system is disclosed. The present invention is a solution to the problems mentioned above. Most important of all, the present invention introduces a concept of "near failure probability". It considers the probability when one disk is close to its end of life. Thus, the present invention can provide a more precise prediction on the time a disk may fail and is an innovative method for or data protection in a cloud-based service system.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, a method for data protection in a cloud-based service system is disclosed below. The method includes the steps of: A. collecting historical operating data of storage devices in the cloud-based service system; B. building up a life expectancy model and a next-7-days failure probability model by the collected operating data; C. inputting operating data in the past 24-hours into the life expectancy model and the next-7-days failure probability model for every storage device to obtain ranges of expected lifespans in respective groups and corresponding failure probabilities; and D. backing up data in the storage devices according to the results of step C.

According to the present invention, the operating data may be performance data, SMART (Self-Monitoring Analysis and Reporting Technology) data, available size of the storage devices, total size of the storage devices, or device metadata. The performance data may be latency, throughput, CPU (Central Processing Unit) load, memory usage, or IOPS (Input/Output Per Second). The storage device may be a HDD (Hard Disk Drive) or a SSD (Solid State Disk). The life expectancy model and the next-7-days failure probability model may be continuously updated with new collected operating data in the future. A time interval to collect the historical operating data of storage devices can be 1 hour. The life expectancy model is built by the steps of: B1. differentiating the storage devices between good and failed; B2. categorizing the failed storages by different ranges of expected lifespans and setting all good storage devices to a specific range of lifespan; B3. binning the operating data of the storage devices into a plurality of groups according to the ranges of expected lifespans; and B4. normalizing the operating data from each storage device for all groups. The life expectancy model is operated by the steps of: B3'. binning the operating data of the storage devices into a plurality of groups according to the ranges of expected lifespans; and B4'. normalizing the operating data from each storage device for all groups. The next-7-days failure probability model is built by the steps of: B5. sorting the operating data; B6. obtaining operating data of storage devices during 7 days from the last time point of collection for failed storage devices, and a plurality of randomly chosen good storage devices; and B7. normalizing the operating data from each storage device. A ratio of failed storage devices to good storage devices used for collecting operating data during 7 days from the last time point of collection is 1:1.

According to the present invention, it may further include the step of: A1. collecting historical operating data of storage devices which are new or just added in the cloud-based service system.

The life expectancy model predicts the ranges of expected lifespans by calculating the inputted operating data in the past 24-hours and the historical operating data with an ANN (Artificial Neural Network) algorithm. Similarly, the next-7-days failure probability model predicts the corresponding failure probabilities by calculating the inputted operating data in the past 24-hours and the historical operating data with an ANN algorithm.

The step D may further back up data for the storage devices which have expected lifespans under a corresponding specific lifespan and/or have failure probabilities over a specific percentage. It may further back up data in the storage devices by snapshots with snapshot intervals calculated. For latter, the snapshot intervals are calculated by inputting the results of step C into a fuzzy system.

The fuzzy system is formed by the steps of: E1. defining linguistic values for the bins, failure probabilities, and snapshot intervals; E2. constructing membership functions to depict degrees of linguistic values for the bins, failure probabilities, and snapshot intervals; and E3. constructing fuzzy rules for the bins, failure probabilities, and snapshot intervals. The fuzzy system may include operating steps of: F1. receiving a bin and a failure probability; F2. processing fuzzification, fuzzy inference, and result aggregation by inputting the bin and the failure probability to membership functions of the fuzzy rules; and F3. defuzzifying to get a snapshot interval.

With the life expectancy model and the next-7-days failure probability model, expected lifespan and failure probability in the coming 7 days of any storage device can be determined. Once the results are available, a schedule for backups of data (snapshot) can be confirmed, too. The mentioned problems can be settled at once.

BRIEF DESCRIPTION OF THE DRAWINGS

FIG. 1 shows a typical cloud-based service system that the method can apply to.

DETAILED DESCRIPTION OF THE PREFERRED EMBODIMENTS

The present invention will now be described more specifically with reference to the following embodiments.

Figure 1:
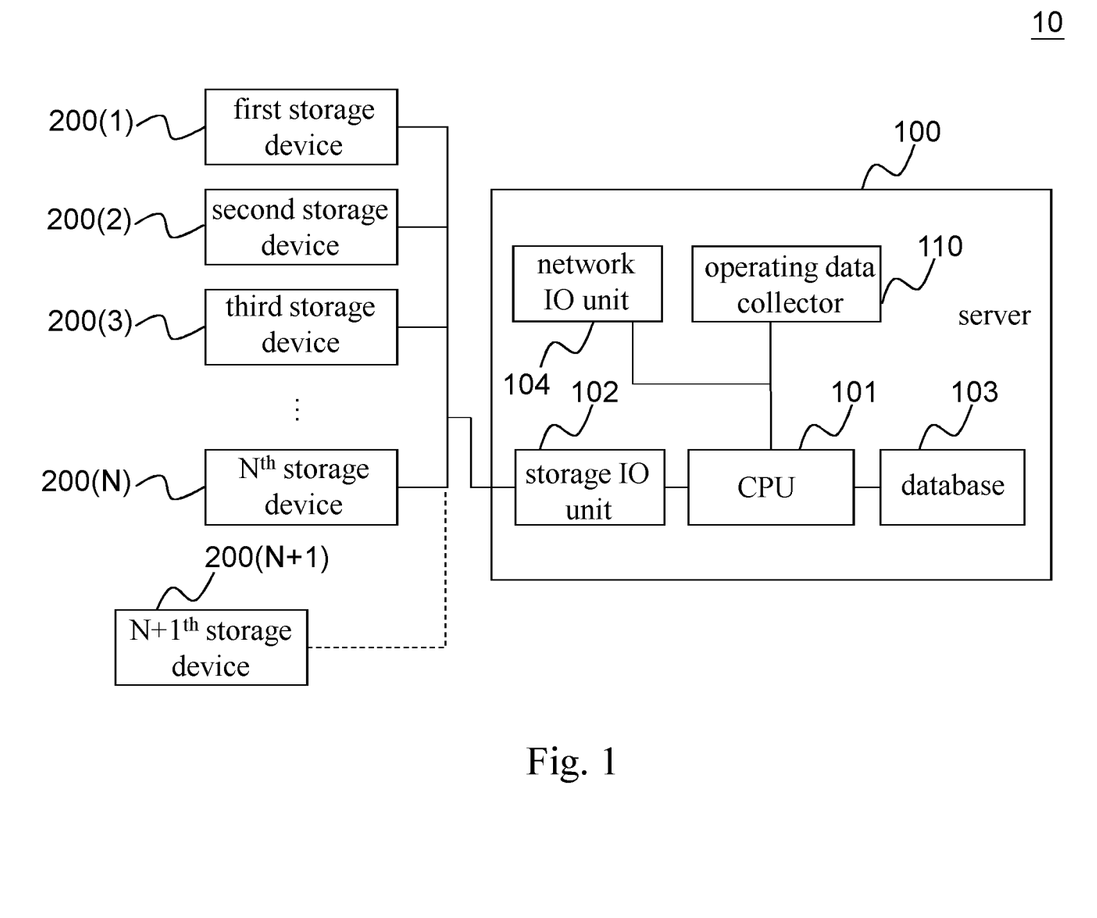

The method disclosed by the present invention is used for data protection in a cloud-based service system. The cloud-based service system is an architecture for workloads, e.g. Email service, video streaming, ERP system, . . . etc., to operate over. A typical cloud-based service system 10 the method may apply to is shown in FIG. 1. The cloud-based service system 10 includes a server (host) 100 and a number of storage devices 200. The server 100 basically has a CPU (Central Processing Unit) 101, a storage IO unit 102, a database 103, and a network I/O unit 104. The CPU 101 manages operations of the cloud-based service system 10 and the workloads run thereon. Meanwhile, the CPU 101 is able to trace and record operating data from the storage devices 200 via the storage IO unit 102 and from the network I/O unit 104. The storage IO unit 102 is hardware conformed to any industrial standards applied to the cloud-based service system 10 for internal data transmission. The industrial standard may be PCI Express (Peripheral Component Interconnect Express), IDE (Integrated Device Electronics), SATA (Serial Advanced Technology Attachment), or USB (Universal Serial Bus). The network I/O unit 104 is hardware for wireless or wired connection to external client devices, e.g. personal computers, tablets or smartphones. They may be a USB port, RJ45, fiber cable connector, Wi-Fi module, or Bluetooth module. The database 103 refers to a HDD, SSD or a DRAM in the server 100, where a database or structural data can be built permanently or temporarily. It is not directly used for data access by workloads, and it facilitates application of the present invention. In this embodiment, there are N storage devices 200 (a first storage device 200(1), a second storage device 200(2), a third storage device 200(3), . . . , an $N^{th}$ storage device 200(N)).

The operating data can be performance data, SMART (Self-Monitoring Analysis and Reporting Technology) data, available size of the storage devices 200, total size of the storage devices 200, or device metadata. The performance data are physical information obtained from operation of the cloud-based service system 10 with the workloads. For example, the performance data may be latency, throughput, CPU load, memory usage, or IOPS (Input/Output Per Second). They can be available from the storage IO unit 102 connected to the storage devices 200, from the network I/O unit 104 to the external client devices, or directly from the data flow through the CPU 101. SAMRT data are used to indicate a possible imminent drive failure and can be presented by a sequence of codes (numbers). It can be obtained by installing monitoring software in each storage device 200. Thus, the storage devices 200 may be a HDD or a SSD according to the definition of SMART. Data other than the performance data and SMART data may be used for the present invention as long as they are easily obtained when the cloud-based service system 10 is running or before all storage devices are equipped.

Above is a standard cloud-based service system which is suitable for applying the present invention. In order to implement the method provided by the present invention, an operating data collector 110 is required. In this embodiment, the operating data collector 110 is a hardware, installed in the server 100 and connected with the CPU 101 and used for collecting the operating data and storing collected operating data in the database 103 (usually in a form of database). In practice, a software having the same functions as the hardware does can be installed to the server 100 and operated by the CPU 101. The operating data collector 110 and the CPU 101 co-work to execute the procedures of the present invention.

Figure 2:
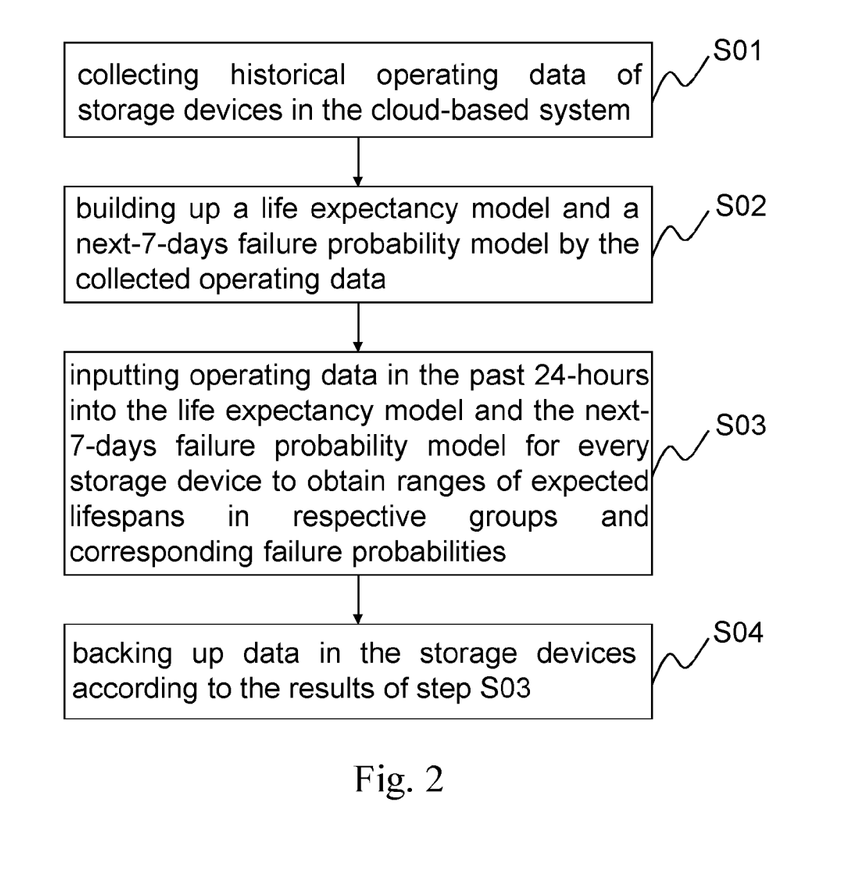
FIG. 2 is a flow chart of a method for data protection in a cloud-based service system according to the present invention.

Please see FIG. 2. It is a flow chart of the method for data protection in the cloud-based service system 10. The first step of the method is to collect historical operating data of storage devices 200 in the cloud-based service system 10 by the operating data collector 110 (S01). Before the method is applied, the cloud-based service system 10 may have operated for a period of time. The operating data collected may reflect loading of data access from workloads (time and frequency the storage devices 200 are accessed by the workloads). However, if there is no historical operating data available, e.g. data lost, or the cloud-based service system 10 is just set up, the operating data for the method can be fetched by collecting individual storage devices 200 which will be used in the cloud-based service system 10.

The second step of the method is to build up a life expectancy model and a next-7-days failure probability model by the collected operating data (S02). The life expectancy model and the next-7-days failure probability model are in a form of a database in the database 103, and run and updated periodically. The procedures to build the life expectancy model and the next-7-days failure probability model are illustrated below.

Figure 3:
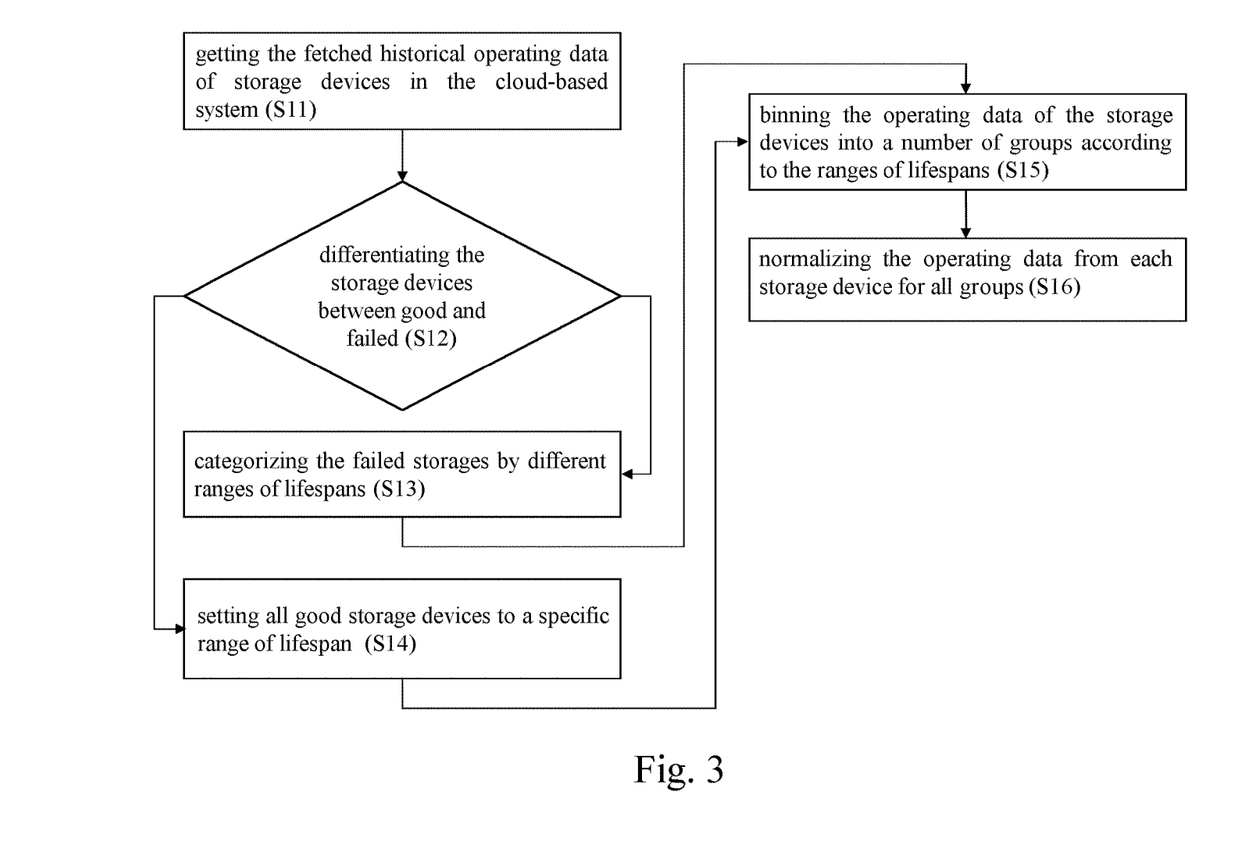
FIG. 3 is a workflow of building the life expectancy model.

Please see FIG. 3. It is a workflow of building the life expectancy model. First, get the fetched historical operating data of storage devices 200 in the cloud-based service system 10 (S11). The historical operating data may be obtained one batch after another. Namely, there might have been certain historical operating data of storage devices 200 in a database for building the life expectancy model already and one batch of fetched historical operating data are just added into. Newly obtained historical operating data of storage devices 200, for example, from half an hour ago, can be seen as new materials to train so that predictions can be closer to reality. The operating data are used to build the life expectancy model and update it in the future. It may take a long time to wait for "failed storage devices". The method provided by the present invention needs to know the arrangement of lifespan of the storage devices 200 along with time. Then, differentiate the storage devices 200 between good and failed (S12). When one storage device 200 is good for work, the collected historical operating data for it just reflects what a difficult environment (application of workloads, administration of the cloud-based service system 10, physical situation of the hardware of the cloud-based service system 10, . . . etc.) the storage device 200 can tolerate. If the storage device 200 is failed to function, the collected historical operating data for it can be considered a record for its life. Any identical storage device 200 may fail if it encounters the same situations the failed one had undergone and is traced to obtain the same or similar operating data. For the failed storage devices 200, categorize them by different ranges of expected lifespans (S13). Here, the range of a lifespan is successive days. For example, from 0 day (DOA, Dead on Arrival) to 90 days, from 91 days to 180 days, from 181 days to 270 days, . . . etc. Each storage device 200 can be categorized into a range of lifespan based on the working days before it is out of order. For the good storage devices 200, since they are still healthy, set all good storage devices 200 to a specific range of lifespan (S14). The specific range of lifespan doesn't have an upper limit. For example, over 1081 days. The "1081 days" may refer to the time the cloud-based service system 10 has run or the time the good storage devices 200 have been working. Namely, the good storage devices 200 have functioned well at least for 1081 days. It should be emphasized that the lower limit of the specific range of lifespan is not limited to 1081 days. It is just an example.

Next, bin the operating data of the storage devices 200 into a number of groups according to the ranges of expected lifespans (S15). Binning (data binning or bucketing) is a data pre-processing technique used to reduce the effects of minor observation errors. The original data values which fall in a given small interval, a bin, are replaced by a value representative of that interval, often the central value. It is a form of quantization. Operating data of the storage devices 200, no matter they are good or failed, are binned according to the ranges of expected lifespans defined in step S15. When one storage device 200 is binned to a group, e.g. bin #4 (from 271 days to 360 days), all operating data are binned to that bin, too. For simplification, the bin number (the value representative of that interval) is the sequence from the first one (from 0 day to 90 days). Last, normalize the operating data from each storage device 200 for all groups (S16). Since the storage devices 200 in each group (bin) may not be the same type (SSD or HDD) or identical model (the same specific or even made by the same manufacturer), it is important to build the life expectancy model for prediction in an "apple-to-apple" way. The prediction should identify specific model rather than all models (what is workable for SSD may not be workable for HDD; what is workable for 512G SSD may not be workable for 1G SSD; what is workable for Toshiba 1G SSD may not be workable for Samsung 1G SSD). After the above processes are finished, the life expectancy model is ready for providing prediction of lifespan for each storage device 200 by showing the results in groups (bins). It should be emphasized that the prediction process can be executed once a day although there might be 24 times of collection of operating data for training.

It should be noticed that the description above for building the life expectancy model is called a learning phase. It means the data used for the steps are repeated again and again before a desired workload on-line or even the cloud-based service system 10 operates. The life expectancy model can then be applied to a running phase, which the life expectancy model operates with consideration of the impact of on-line workload. The processes for running the life expectancy model can be reduced to get the fetched historical operating data of storage devices 200 in the cloud-based service system 10 (S11); bin the operating data of the storage devices 200 into a number of groups according to the ranges of expected lifespans (S15); and normalize the operating data from each storage device 200 for all groups (S16). At this phase, just repeat step S11, step S15 and step S16 and expected bins can be found by referencing the life expectancy model.

Figure 4:
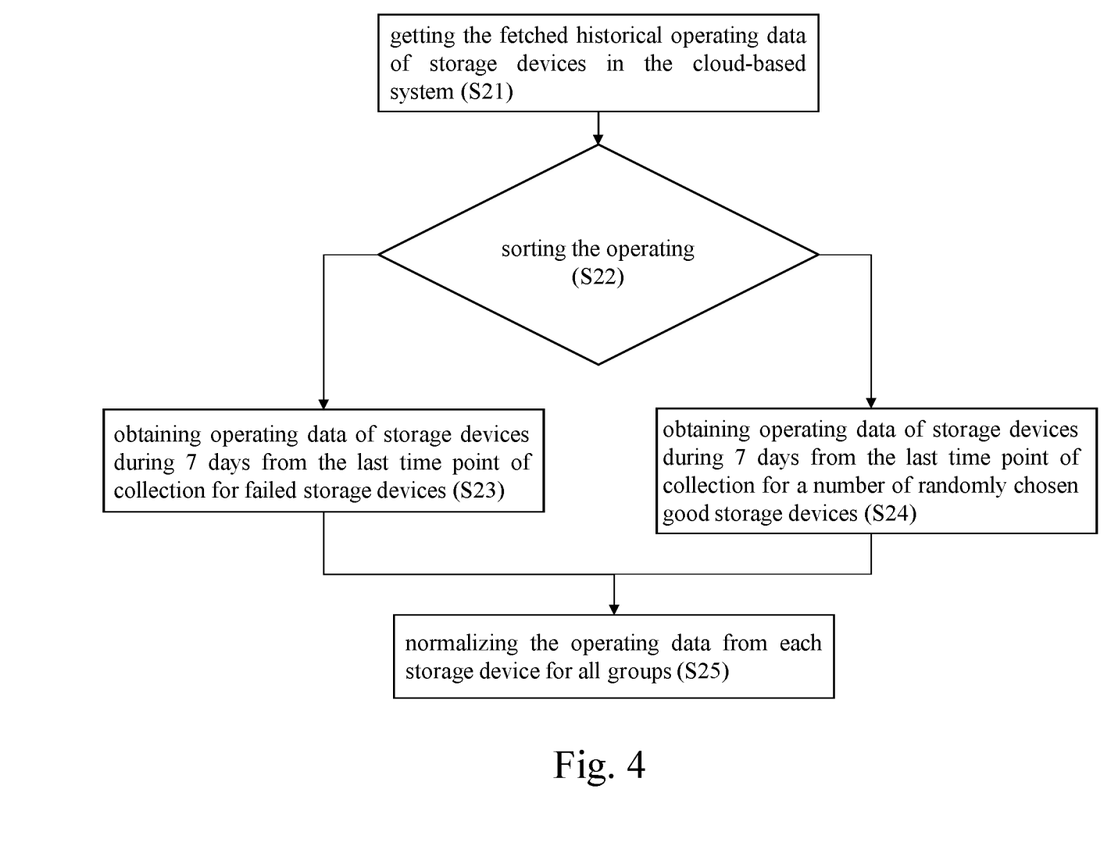
FIG. 4 is a workflow of building the next-7-days failure probability model.

As to building the next-7-days failure probability model, please see FIG. 4. It is a workflow of building the next-7-days failure probability model. First, get the fetched historical operating data of storage devices 200 in the cloud-based service system 10 (S21). Similarly, the historical operating data may be obtained one batch after another. There might have been certain historical operating data of storage devices 200 in a database for building the next-7-days failure probability model already and one batch of fetched historical operating data are just added into. Newly obtained historical operating data of storage devices 200 can be seen as new materials to train so that predictions can be closer to reality. However, not all of the historical operating data are useful. Next, the next-7-days failure probability model needs to sort the operating data (S22). It is to know which operating data come from good storage devices and which operating data come from failed storage devices. Then, obtain operating data of storage devices 200 during 7 days from the last time point of collection for failed storage devices 200 (S23) and obtain operating data of storage devices 200 during 7 days from the last time point of collection for a number of randomly chosen good storage devices 200 (S24). If the last time point of collection is one hour ago, the operating data of storage devices 200 should be collected from the time points before one hour ago but after 168 hours ago. It is important, according to the present invention, a ratio of failed storage devices 200 to good storage devices 200 used for collecting operating data during 7 days from the last time point of collection is 1:1. It can have a balanced way to predict the probability of failure for the storage devices 200.

Since the number of good storage devices 200 must be more than that of the failed storage devices 200, that is why step S24 needs a number of randomly chosen good storage devices 200, rather than all of the good storage devices 200. Finally, normalize the operating data from each storage device 200 (S25). As well, normalization makes the prediction of the failure probabilities more precise for each model of the storage devices 200. According to the present invention, the life expectancy model and the next-7-days failure probability model should be continuously updated with new collected operating data in the future. Time interval to collect the historical operating data of the storage devices 200 is better 1 hour.

Similar to the scenario of life expectancy model, the above description for the next-7-days failure probability model is called a learning phase. It means the data used for the steps are repeated again and again before a desired workload is on-line or even the cloud-based service system 10 operates. The next-7-days failure probability model can then be applied to a running phase, too. The next-7-days failure probability model operates with consideration of the impact of workload on-line. The next-7-days failure probability model is operated by getting the fetched historical operating data of storage devices 200 in the cloud-based service system 10. The failure probability can be obtained by referencing the next-7-days failure probability model.

A third step of the method disclosed in the present invention for data protection in the cloud-based service system 10 is inputting operating data in the past 24-hours into the life expectancy model and the next-7-days failure probability model for every storage device 200 to obtain ranges of expected lifespans in respective groups and corresponding failure probabilities (S03). Please see FIG. 5. It is a table showing inputs and outputs of the life expectancy model and the next-7-days failure probability model. After life expectancy model and the next-7-days failure probability model are ready for providing predictions, the input operating data are inputted. There should be N sets of operating data but only 3 are shown for illustration. The first storage device 200(1) has a predicted ranges of expected lifespans fall in the group of bin #18 (expected lifespan from 3061 hours to 3240 hours) and a failure probability of 35%. The second storage device 200(2) has a predicted ranges of expected lifespans fall in the group of bin #21 (expected lifespan from 3601 hours to 3780 hours) and a failure probability of 21%. The third storage device 200(3) has a predicted ranges of expected lifespans fall in the group of bin #2 (expected lifespan from 181 hours to 360 hours) and a failure probability of 95%. It seems the third storage device 200(3) has short expected lifespan and a higher chance to fail in the next 7 days. Thus, data stored in the third storage device 200(3) should be duplicated in case of lost. It is the last step in the method of the present invention: backing up data in the storage devices 200 according to the results of step S03 (S04).

According to the present invention, the life expectancy model predicts the ranges of expected lifespans by calculating the inputted operating data in the past 24-hours and the historical operating data with an ANN (Artificial Neural Network) algorithm. Similarly, the next-7-days failure probability model also predicts the corresponding failure probabilities by calculating the inputted operating data in the past 24-hours and the historical operating data with an ANN algorithm. The ANN algorithm applied to the life expectancy model and the ANN algorithm applied to the next-7-days failure probability model may be the same or different. There are many ANN algorithms and all of them are applicable as long as they can calculate parameters between inputted operating data and the fetched historical operating data. The life expectancy model indicates a group (# of bin) and the next-7-days failure probability model provides a probability for each storage device 200.

If a new type storage device or new storage device, e.g. an $N+1^{th}$ storage device 200(N+1) will be used to the cloud-based service system 10 and it has no records obtained by the cloud-based service system 10, according to the present invention, there should be one more step after step S01: collecting historical operating data of storage devices 200 which are new or just added in the cloud-based service system 10 (S01'). As mentioned above, before the $N+1^{th}$ storage device 200(N+1) is on-line, the rest storage devices 200(1) to 200(N) already have collected a lot of operating data in the past. There should be an existing life expectancy model and an existing next-7-days failure probability model. The historical operating data of the $N+1^{th}$ storage device 200(N+1) may be obtained from other data centers or test site and distributed to the cloud-based service system 10. After the procedure from step S01 to S02 are finished, a new life expectancy model and a new next-7-days failure probability model can be created. For the $N+1^{th}$ storage device 200(N+1), it has to decide which models (existing or new) can predict its performance more precisely. The judgement can be made manually by an administrator of the server 100. It can also be done by the operating data collector 110. The operating data collector 110 acts like an arbiter and makes the decision based on the performance of the $N+1^{th}$ storage device 200(N+1) in the future. Time to make the decision may be long. Before the decision is issued, either the existing models or the new models can be used as default models to run in the cloud-based service system 10. If the operating data collector 110 found both models provide predictions for the $N+1^{th}$ storage device 200(N+1) which are far from real performance, the operating data collector 110 can decide to create newer models according to the procedure of the method until one set of models having predictions within an acceptable range.

Figure 5:
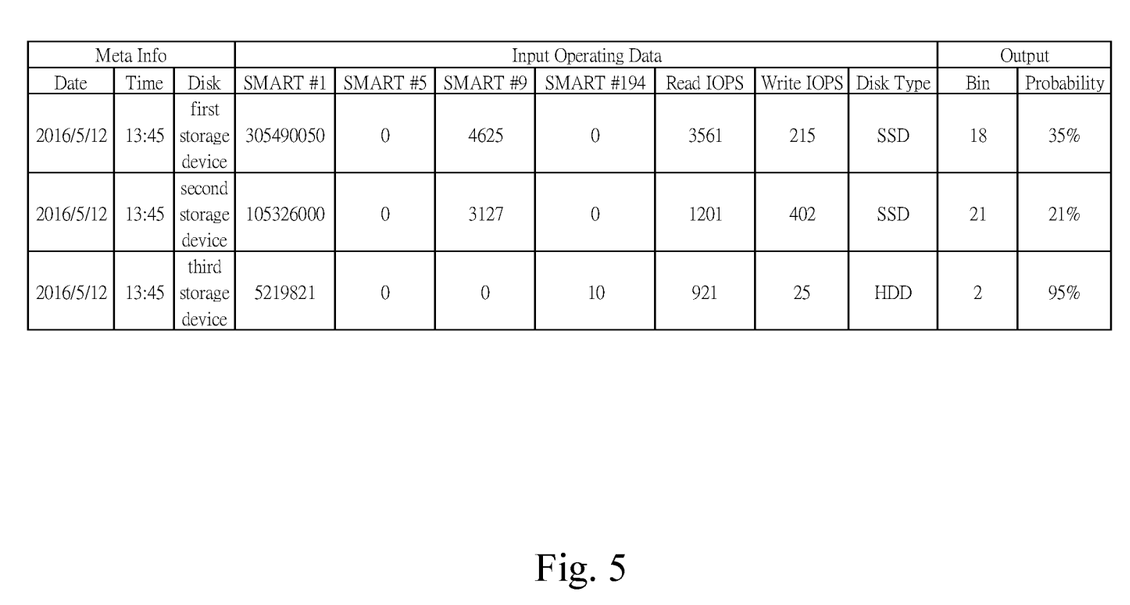
FIG. 5 is a table showing inputs and outputs of the life expectancy model and the next-7-days failure probability model.

For data protection, backups for data in the storage devices 200 with high failure probabilities or being predicted to be short lifespan are necessary. The only thing to take care is the frequency for backup (in this example, it is whether a backup is carried out in the next day). A simple way to implement step S04 is backing up data for the storage devices 200 which have expected lifespans under a corresponding specific lifespan and/or have failure probabilities over a specific percentage. For example, for the first storage device 200(1), since it is an SSD, it can be set to process data backup once it falls in bin #18 and failure probability is predicted to be over 90%. Because the failure probability in FIG. 5 is only 35%, the data in the first storage device 200(1) will not be backed up from 13:45 2016 May 12 to 13:45 2016 May 13. The interval is not limited to 1 day (24 hours). It can be determined and will be illustrated later.

Of course, the backup may be snapshot of the storage device 200. In another embodiment, the present invention provides another step to emphasize step S04: backing up data in the storage devices 200 by snapshots with snapshot intervals calculated (S04'). The snapshot intervals are calculated by inputting the results of step S03 into a fuzzy system. The fuzzy system applied is built by the following steps (please refer to FIG. 6): defining linguistic values for the bins, failure probabilities, and snapshot intervals (S31); constructing membership functions to depict degrees of linguistic values for the bins, failure probabilities, and snapshot intervals (S32); and constructing fuzzy rules for the bins, failure probabilities, and snapshot intervals (S33). For a better understanding, please see FIG. 7.

Figure 7:
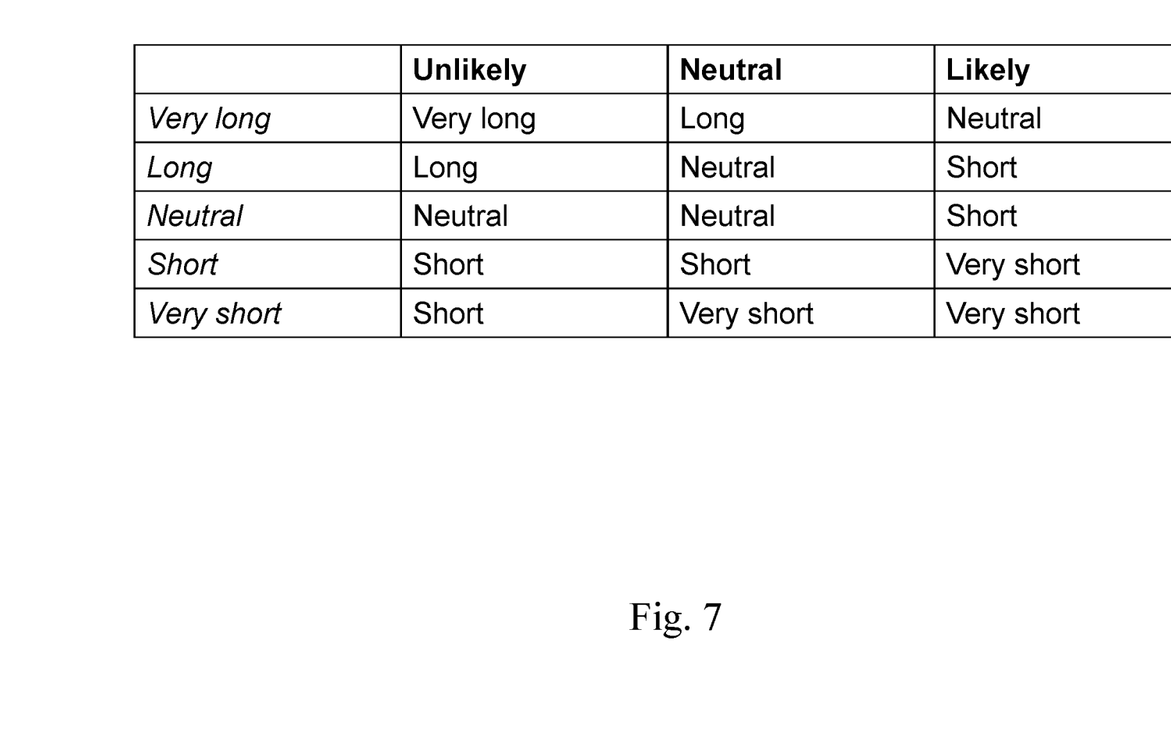
FIG. 7 shows linguistic values for the bins, failure probabilities, and snapshot intervals and fuzzy rules.
Figure 8:
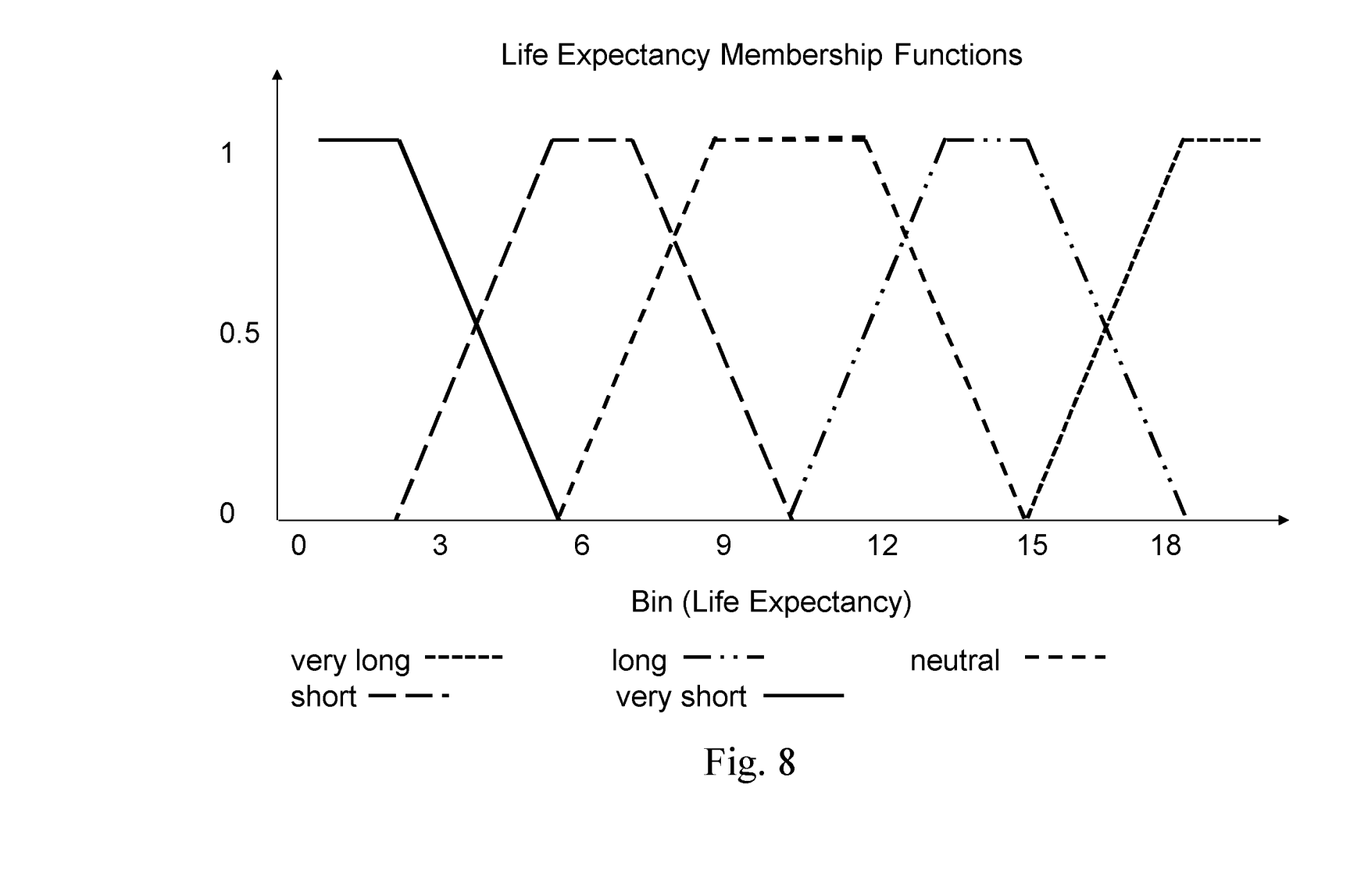
FIG. 8, FIG. 9, and FIG. 10 show membership functions of the fuzzy system.
Figure 9:
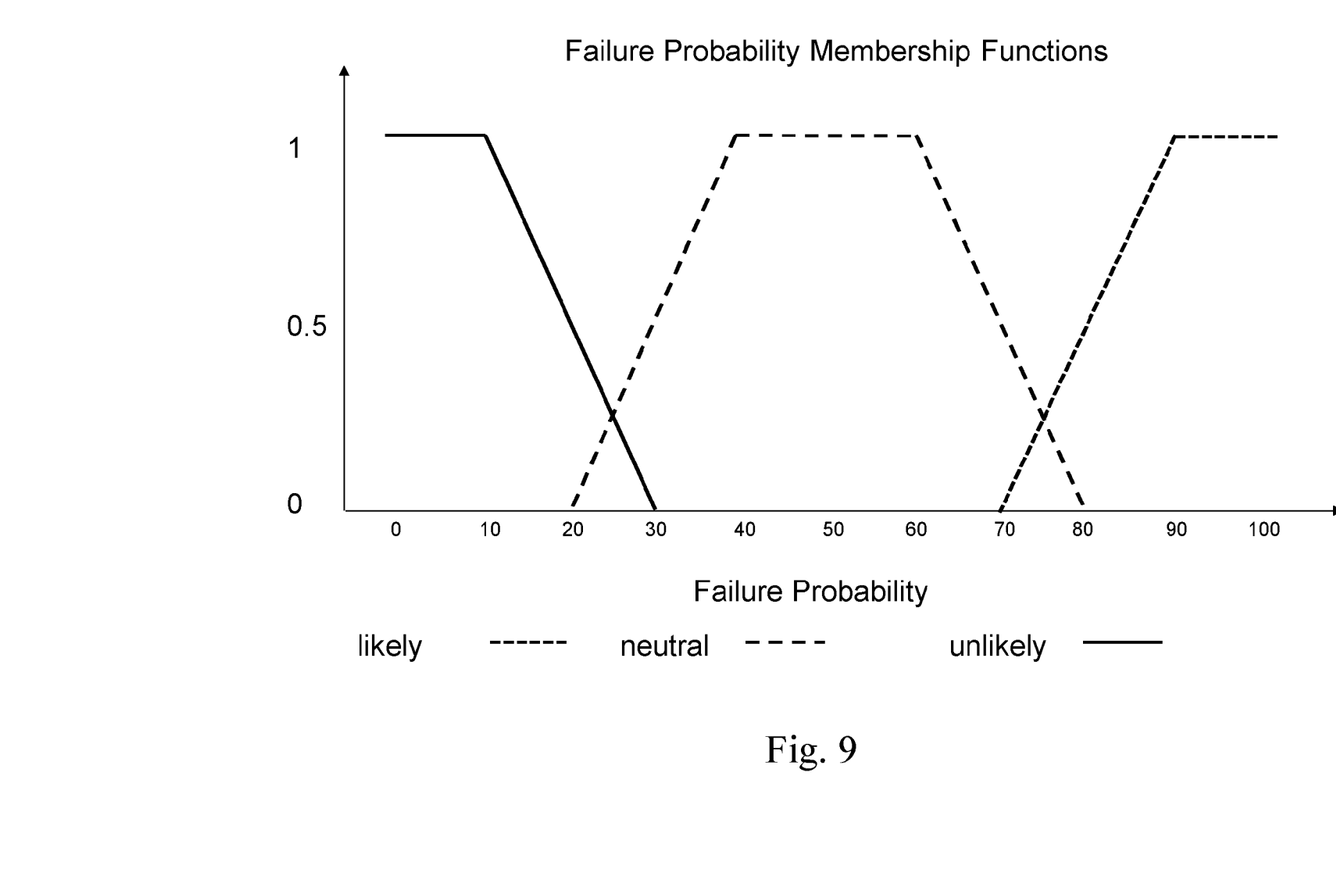
Figure 10:
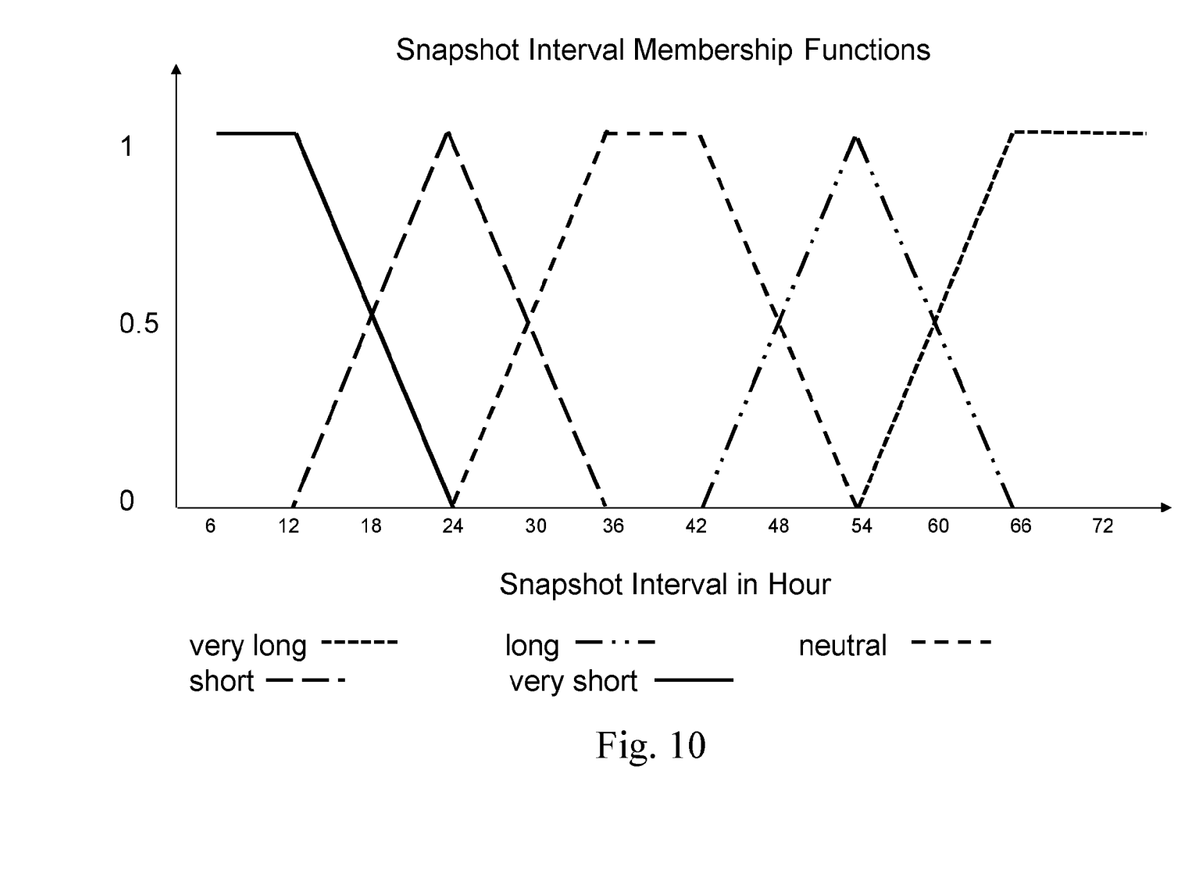

FIG. 7 shows linguistic values for the bins, failure probabilities, and snapshot intervals and fuzzy rules. Linguistic values for the bins (life expectancy) are very long, long, neutral, short, and very short. Linguistic values for the failure probabilities are likely, neutral, and unlikely. Linguistic values for the snapshot intervals are very long, long, neutral, short, and very short. The fuzzy rules are illustrated in the entries of each bin row and failure expectancy column. For example, if the life expectancy is long and the failure probability is likely, then the snapshot interval is short. Definition of the fuzzy rules is built based on the policies of workloads running over the cloud-based service system 10. The fuzzy rules can be changed according to the requirement (SLA) of the workloads. Membership functions to depict degrees of linguistic values for the bins, failure probabilities, and snapshot intervals are shown in FIG. 8, FIG. 9, and FIG. 10, respectively.

Figure 6:
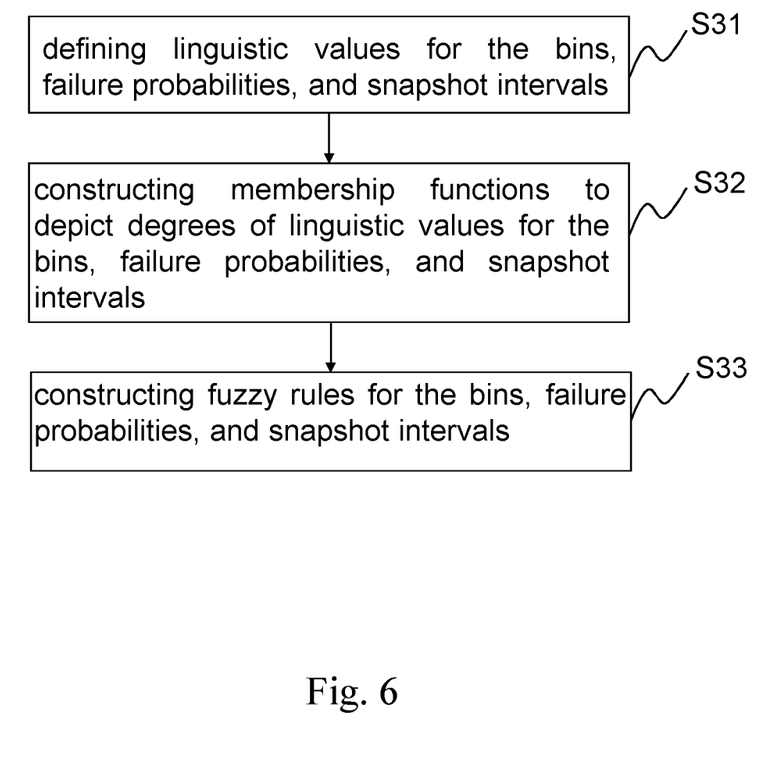
FIG. 6 is a flow chart of a method forming a fuzzy system.

Operating steps of the fuzzy system are illustrated below. First, receive a bin and a failure probability (S41). The bin and the failure probability are the results in step (S03). Then, process fuzzification, fuzzy inference, and result aggregation by inputting the bin and the failure probability to membership functions of the fuzzy rules (S42). There are many prior arts for fuzzification, fuzzy inference, and result aggregation. It is not limited by the present invention. Like other fuzzy system, defuzzify to get a snapshot interval (S43). As well, a way to defuzzify may be used according to the method chosen for fuzzification. It is also not limited by the present invention. The snapshot interval calculated can be immediately applied to one storage device 200. Of course, all the storage devices 200 can have their snapshot intervals decided once a day, even the snapshot interval is 0 (no need to process data protection currently).

Although the embodiment illustrated above is to collect data for training and updating the life expectancy model and the next-7-days failure probability model from one cloud-based service system, it is not necessary to apply the models for the same cloud-based service system only. In a broad way for application, the life expectancy model and the next-7-days failure probability model can be trained in a data center or a cloud-based service system, and then applied to another cloud-based service system which has the same or similar configured storage devices. It has an advantage to implement the method with limited resources.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:
1. A method for data protection in a cloud-based service system, comprising the steps of:
   A. collecting historical operating data of storage devices in the cloud-based service system;
   B. building up a life expectancy model and a next-7-days failure probability model with the collected historical operating data using a machine learning algorithm;
   C. inputting operating data in the past 24-hours into the life expectancy model and the next-7-days failure probability model for every storage device to predict ranges of expected lifespans in respective groups and corresponding failure probabilities; and
   D. backing up data in the storage devices according to the predicted ranges of expected lifespans in respective groups and corresponding failure probabilities obtained in step C,
   wherein the next-7-days failure probability model is built by the steps of:
   a) sorting the collected historical operating data corresponding to the next-7-days failure probability model;
   b) obtaining operating data of storage devices during 7 days from the last time point of collection for failed storage devices, and a plurality of randomly chosen good storage devices, wherein the obtained operating data corresponds to the next-7-days failure probability model;
   c) normalizing the obtained operating data from each storage device; and
   d) building the next-7-days failure probability model with the normalized operating data using the machine learning algorithm.

2. The method according to claim 1, wherein the collected historical operating data and the inputted operating data comprises performance data, SMART (Self-Monitoring Analysis and Reporting Technology) data, available size of the storage devices, total size of the storage devices, or device metadata.

3. The method according to claim 2, wherein the performance data is latency, throughput, CPU (Central Processing Unit) load, memory usage, or IOPS (Input/Output Per Second).

4. The method according to claim 1, wherein the storage device is a HDD (Hard Disk Drive) or a SSD (Solid State Disk).

5. The method according to claim 1, wherein the life expectancy model and the next-7-days failure probability model are continuously updated with new collected operating data in the future.

6. The method according to claim 1, wherein a time interval to collect the historical operating data of storage devices is 1 hour.

7. The method according to claim 1, wherein the life expectancy model is built by the steps comprising:
   B1. differentiating the storage devices between good and failed;
   B2. categorizing the failed storages by different ranges of expected lifespans and setting all good storage devices to a specific range of lifespan;
   B3. binning the collected historical operating data corresponding to the life expectancy model of the storage devices into a plurality of groups according to the ranges of expected lifespans; and
   B4. normalizing the collected historical operating data corresponding to the life expectancy model from each storage device for all groups.

8. The method according to claim 1, wherein the life expectancy model is operated by the steps comprising:
   B3'. binning the inputted operating data of the storage devices into a plurality of groups according to the ranges of expected lifespans; and
   B4'. normalizing the inputted operating data from each storage device for all groups.

9. The method according to claim 1, wherein a ratio of failed storage devices to good storage devices used for collecting operating data during 7 days from the last time point of collection is 1:1.

10. The method according to claim 1, further comprising the step of:
- A1. collecting historical operating data of storage devices which are new or just added in the cloud-based service system.

11. The method according to claim 1, wherein the life expectancy model predicts the ranges of expected lifespans by calculating the inputted operating data in the past 24-hours and the collected historical operating data corresponding to the life expectancy model with an ANN (Artificial Neural Network) algorithm.

12. The method according to claim 1, wherein the next-7-days failure probability model predicts the corresponding failure probabilities by calculating the inputted operating data in the past 24-hours and the collected historical operating data corresponding to the next-7-days failure probability model with an ANN algorithm.

13. The method according to claim 1, wherein the step D is further to back up data for the storage devices which have expected lifespans under a corresponding specific lifespan and/or have failure probabilities over a specific percentage.

14. The method according to claim 1, wherein the step D is further to back up data in the storage devices by snapshots with snapshot intervals calculated.

15. The method according to claim 14, wherein the snapshot intervals are calculated by inputting the results of step C into a fuzzy system.

16. The method according to claim 15, wherein the fuzzy system is formed by the steps of:
- E1. defining linguistic values for expected lifespans, failure probabilities, and snapshot intervals;
- E2. constructing membership functions to depict degrees of linguistic values for expected lifespans, failure probabilities, and snapshot intervals; and
- E3. constructing fuzzy rules for expected lifespans, failure probabilities, and snapshot intervals.

17. The method according to claim 16, wherein the fuzzy system comprises operating steps of:
- F1. receiving an expected lifespan and a failure probability;
- F2. processing fuzzification, fuzzy inference, and result aggregation by inputting the expected lifespan and the failure probability received in step F1. to membership functions of the fuzzy rules constructed in step E3; and
- F3. defuzzifying to get a snapshot interval.

* * * * *